United States Patent [19]
Schober et al.

[11] Patent Number: 4,942,762
[45] Date of Patent: Jul. 24, 1990

[54] FLAT UNIT FOR MOTOR VEHICLE TEST BEDS

[75] Inventors: Karl Schober, Weinstadt; Norbert Schaub, Remseck, both of Fed. Rep. of Germany

[73] Assignee: Daimler-Benz AG, Fed. Rep. of Germany

[21] Appl. No.: 402,565

[22] Filed: Sep. 5, 1989

[30] Foreign Application Priority Data

Sep. 3, 1988 [DE] Fed. Rep. of Germany ....... 3830048

[51] Int. Cl.⁵ .......................................... G01M 15/00
[52] U.S. Cl. ..................................................... 73/117
[58] Field of Search ...................... 73/117, 117.1, 146, 73/865.6, 123–127

[56] References Cited

U.S. PATENT DOCUMENTS 3,520,180 7/1970 Prohemus et al. .

FOREIGN PATENT DOCUMENTS

| 2244223 | 3/1973 | Fed. Rep. of Germany . |
| 2735925 | 3/1978 | Fed. Rep. of Germany . |
| 2151652 | 4/1973 | France . |
| 0124401 | 9/1979 | Japan .................................... 73/117 |

Primary Examiner—Robert Raevis
Attorney, Agent, or Firm—Evenson, Wands, Edwards, Lenahan & McKeown

[57] ABSTRACT

The invention relates to a flat-track unit for motor-vehicle test beds in which a roadway-simulating belt is guided over two rollers lying in parallel. The upper test side of the belt lies roughly at ground level and accommodates a vehicle wheel and can be excited by a supporting shoe below the belt via an excitation cylinder to develop vertical oscillations which are to simulate roadway vibrations. The two belt-guiding rollers are in turn mounted in a frame which in turn is guided so as to be vertically movable and can be excited by a further excitation cylinder to develop vertical oscillations. In the process, the supporting shoe oscillations are limited to short-stroke and high-frequency oscillation portions of simulated driving conditions whereas the frame is excited merely by the long-stroke and low-frequency oscillation portions. This offers the advantage that long-stroke vertical oscillations can also be reproduced in a manner close to reality, but nonetheless, the vertical oscillations of the test side, relative to the belt guide rollers, are only relatively small. By the use of hollow pistons, the required excitation energy is kept within acceptable limits and over all weight is reduced.

18 Claims, 2 Drawing Sheets

FLAT UNIT FOR MOTOR VEHICLE TEST BEDS

BACKGROUND AND SUMMARY OF THE INVENTION

The invention relates to a flat-track unit for motor-vehicle test beds comprising a roadway-simulating looped belt which is guided over two rollers and accommodates a vehicle wheel on its top upper test side which is orientated roughly horizontally at the ground level. The two rollers are mounted in a frame which is supported in a vertically floating manner and is mechanically guided in the vertical direction by a spring mounting which absorbs the proportionate dead weight of the flat-track unit and the wheel load.

A rectilinear supporting shoe located between the rollers supports the test side of the belt in a guiding or rolling manner at the contact region with a vehicle wheel. The supporting shoe is vertically movable relative to the frame by a vertically orientated hydraulic shoe excitation cylinder which acts centrally on it. The cylinder can be excited to develop vertical oscillations for simulating roadway vibrations. One of the rollers is connected via a universal-joint shaft to a drive and braking unit for simulating traction and braking forces. The device and braking unit is arranged so as to be roughly on the same axis as and removed from the roller in a vertically immovable position next to the frame.

U.S. Pat. No. 3,520,180 shows this general type of flat-track.

Flat-track units of this type are intended to reproduce on the test bed, the rolling characteristics of the vehicle wheel on the road in as true to nature manner as is possible. In the process, the vehicle wheel stands on a flat contact surface which can be driven or even braked to simulate braking or traction forces. In addition, the roadway vibrations are simulated by vertical oscillations being imparted to the flat-track unit. Since the belt cannot itself provide a flat contact surface on account of its flexibility, the belt is supported at the contact region of the vehicle wheel by a supporting shoe which is flat on its top. This supporting shoe is excited by a vertically disposed excitation cylinder to simulate the roadway vibrations. In the previously known flat-track unit, the frame carrying the rollers is supported elastically on the supporting shoes and the latter, by a vertically disposed excitation cylinder, is excited to develop vertical oscillations. In order to avoid resonances of the frame relative to the supporting shoe, the frame is restrained on a foundation via oscillation dampers. So that the frame can be of particularly light construction, the power source for the roller driver is arranged in a fixed position removed from the frame, via movable universal-joint shafting. In this known flat-track unit, it is disadvantageous that the supporting shoe can accomplish large unchecked amplitudes of oscillation relative to the frame. Since these amplitudes of oscillation cannot readily be bridged by the belt, this requires that the belt be overstretched. Furthermore, it is disadvantageous since the excitation energy has to be very high on account of the damping of the frame oscillation. This results in heat in the oscillation dampers due to energy loss and this heat unfortunately has to be discharged at this location.

The object of the instant invention is to further develop the above-referenced flat-track so that the excitation energy necessary for a vertical excitation of the flat-track unit is reduced and that no large unchecked amplitudes of vertical oscillation of the belt relative to the frame can occur.

This object is achieved according to the invention by having the spring mounting of the frame rely on hydropneumatic springs which have a cylinder housing rigidly connected a least indirectly, to the foundation. A supporting shoe excitation cylinder arranged completely inside the belt loop is rigidly supported at its bottom to the frame. During vertical excitation this shoe excitation cylinder is limited to the short-stroke and high-frequency oscillation portions of the entire excited oscillations simulating the roadway vibrations. The frame is supported rigidly at least indirectly on the foundation by means Of a further hydraulic frame excitation cylinder acting rigidly at the bottom and roughly centrally on the frame. This further frame support cylinder can be excited to develop vertical oscillations which are limited to the long-stroke, low-frequency oscillation portions of the entire excited oscillations.

Owing to the separate and forced excitation of the supporting shoed with short-stroke and high-frequency oscillation portions and with the frame being excited with long-stroke and low-frequency oscillation portions, an unchecked oscillation of the supporting shoe relative to the frame is avoided. Nonetheless the long-stroke vertical oscillations that occur in reality are readily reproduced on the flat-track unit. Due to the fact that damping of oscillations is now no longer necessary, the excitation energy can be kept low.

It is advantageous if the frame has a cross piece, which passes through the belt loop for supporting the supporting-shoe excitation cylinder and a further cross piece is arranged below the belt loop connection to the piston rod of the frame excitation cylinder. The frame is essentially formed by two side cheeks arranged on both sides of the belt, and are connected by the two cross pieces to carry the bearings for the rollers. Two side cheeks, as viewed parallel to the roller axes are designed in rough approximation as a trapezoidal shape or extended V-shape.

The cylinder housing of the frame excitation cylinder is fixed, in terms of tilting and rotation, at least indirectly to the foundation. Its piston rod is designed as a guide column connected to the frame so as to be fixed in terms of tilting and rotation and is guided in a stable manner in the cylinder housing in such a way that the frame excitation cylinder also serves as a mechanical vertical guide for the frame. This piston rod extends axially past an upper and lower surface area and is guided over the entire longitudinal extent in the cylinder housing of the frame. The piston is designed as an annular collar encircling the piston rod with working spaces acting upon the annular piston in both directions.

It is also advantageous if the vertical spring mounting of the frame be in the form of a hydropneumatic spring having an annular piston and working space which can be acted upon hydraulically by pressure stored in a gas-pressure accumulator, which pressure remains largely constant irrespective of the stroke. This piston can be constructionally integrated with the frame excitation cylinder in such a way that the piston rod is provided with a further annular piston to which a hydraulically separate working space is allocated at the bottom.

The further piston is likewise designed as an annular collar encircling the piston rod which has a hollow inside to reduce weight.

Other objects, advantages and novel features of the present invention will become apparent from the following detailed description of the invention when considered in conjunction with the accompanying drawings.

DETAILED DESCRIPTION OF THE DRAWINGS

Figure 1:
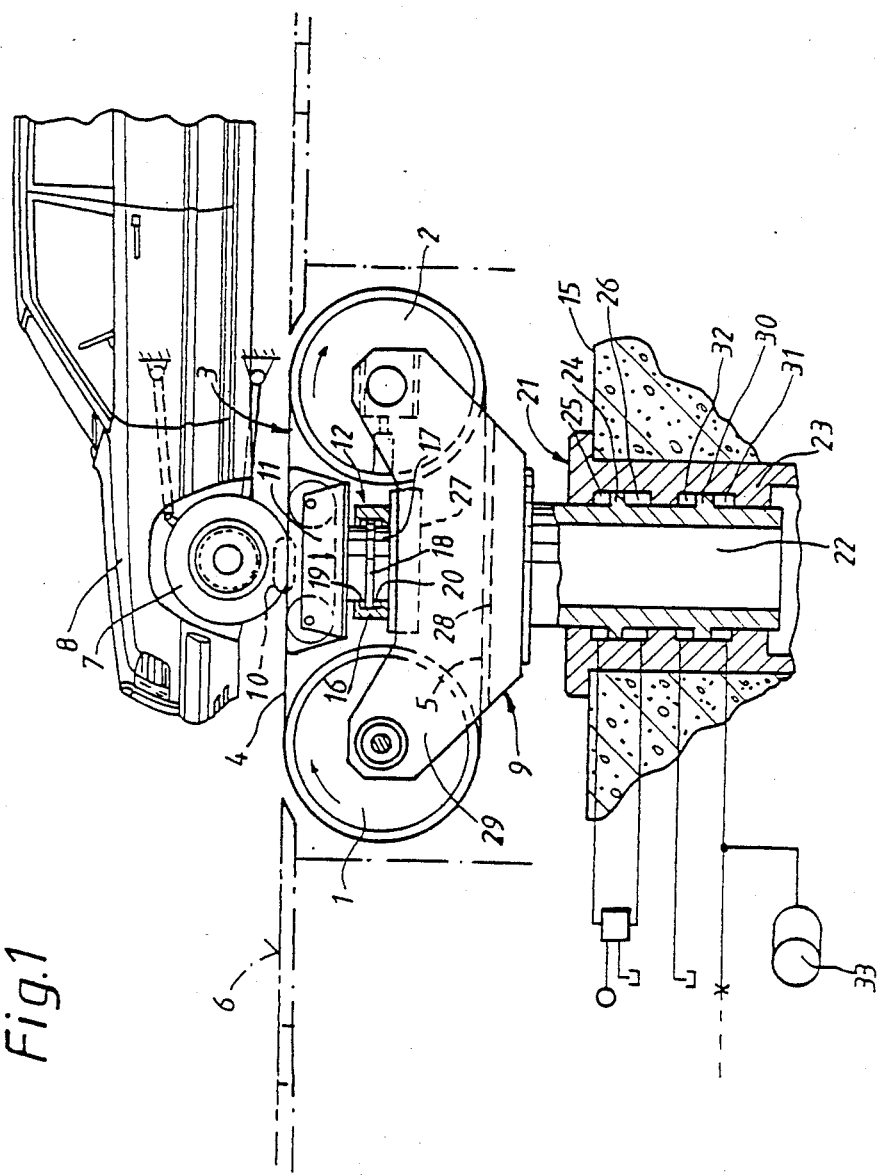
FIG. 1 shows a side view of a flat-track unit according to the invention.
Figure 2:
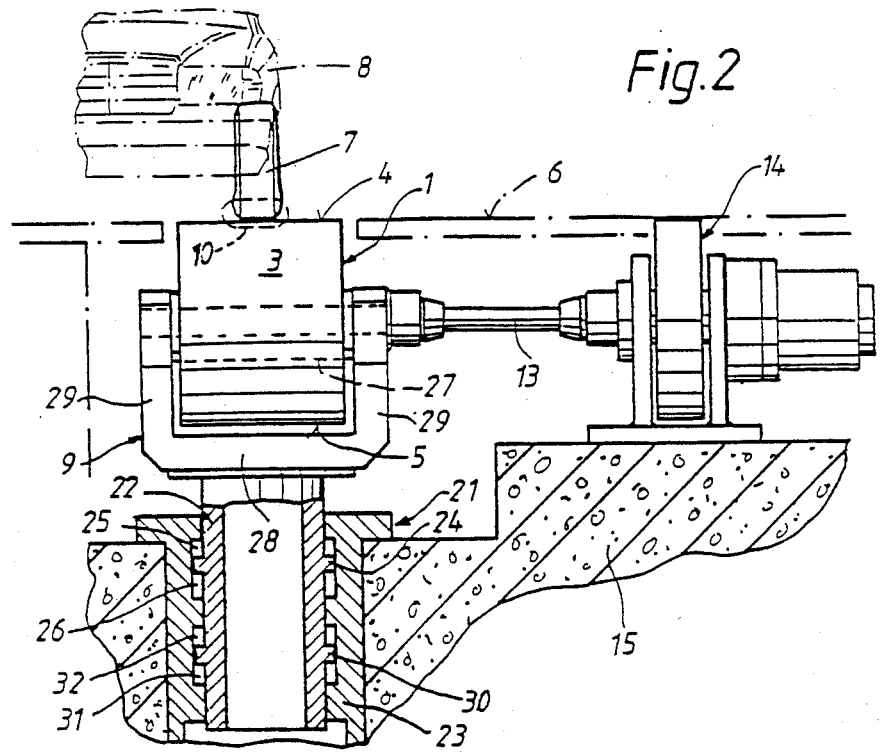
FIG. 2 shows a longitudinal view of the flat-track unit according to FIG. 1.
Figure 3:
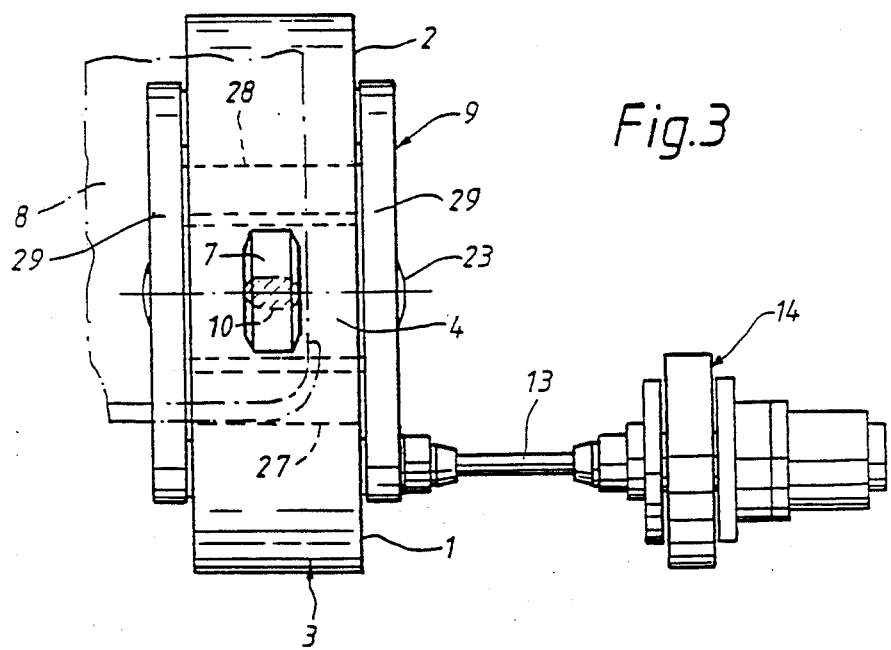
FIG. 3 shows a plan view of the flat-track unit.

The flat-track unit is part of a motor-vehicle test bed which is fitted with at least two flat-track units preferably with a total of four flat-track units. An essential component of the flat-track unit is a flexible endless belt 3 which is guided over a driven roller 1 and a non-driven roller 2. The belt can be constructed as a steel-belt strip which is provided with non-skid surface roughening on the top. The two rollers 1 and 2 are held in a frame 9. The non-driven roller 2 is movable toward and away from the driven roller axis so that the belt can be tensioned. In addition, the non-driven roller 2 is also adjustable in its parallelism relative to the driven roller to that in this way the belt motion can be regulated. Apart from a belt-edge regulating means known per se, the rollers are slightly cambered to facilitate constant belt motion. The upper and test side 4 of the belt extending between the two rollers 1 and 2, lies roughly horizontally and at ground level. Placed on the top of the test side 4 is a vehicle wheel 7. The other (bottom) side 5 has no special function. The contact region 10 between the vehicle wheel 7 and the test side 4 is supported by a supporting shoe 11 over which the test side 4 can slide or roll with low resistance. Supporting units of this general type, which often also function as hydrostatic flat bearings, are known per se. The frame 9 is supported in a vertically floating manner and is mechanically guided in the vertical direction via a spring mounting absorbing the proportionate dead weight of the flat-track unit as well as the wheel load. To simulate drive and braking forces on the vehicle wheel 7, one of the two rollers is driven. In order that the flat-track unit can be constructed to be as light as possible, since it is to be excited to develop vertical oscillations, the drive and braking unit 14 serving to rotate the driven roller 1 is arranged in a fixed position separated from the roller 1, i.e. arranged to be vertically immovable. The drive and braking unit 14 is connected to the roller via a universal-joint shaft 13.

In order that the flat-track unit, or the wheel contact area 10 of the flat-track unit, can be excited to develop vertical oscillations in a manner which is as close to reality as possible and with the least possible expenditure of energy, the supporting shoe 11 is guided so as to be vertically movable relative to the frame and can be excited to develop vertical oscillations by means of a vertically orientated hydraulic supporting shoe excitation cylinder 12 acting centrally on it. The supporting shoe excitation cylinder 12 is arranged completely inside the belt loop of the belt 3 and is rigidly supported at its bottom to the portion of frame 9. In exciting the supporting shoe, the supporting-shoe excitation cylinder 12 is limited to short-stroke and high-frequency oscillation portions of the entire excited oscillations simulating roadway vibration.

The spring mounting of the frame is designed as a hydropneumatic spring and is rigidly connected at the bottom, at least indirectly to the foundation 15. In addition, the frame 9 can also be excited to develop vertical oscillations by means of a further hydraulic frame excitation cylinder 21. The frame excitation cylinder 21 is supported at the bottom of the frame by its piston rod 22 and the cylinder housing 23 is rigidly connected to the foundation 15. During the vertical excitation of the flat-track unit, the frame excitation cylinder 21 is limited to the long-stroke, low-frequency oscillation portions of the entire excited oscillations simulating roadway vibrations. The oscillation motions of the frame excitation cylinder 21 on the one hand and the oscillation motions of the supporting-shoe excitation cylinder 12 on the other hand, have to be matched with one another in correct phase relationship and synchronized with one another so that a predetermined roadway vibration recorded during road runs can be reproduced in a manner close to reality.

In order that the two excitation cylinders 12 and 21 can be properly mechanically coupled to the frame 9, the frame 9 has a cross piece 27 which passes through the belt loop of the belt 3, runs above the lower side 5 of the belt and serves to support the supporting-shoe excitation cylinder 12 or its cylinder housing 16. In addition, the frame 9 has a further cross piece 28 which is arranged outside and below the belt loop, i.e. below the lower side 5. This cross piece 28 serves to connect the piston rod 22 of the frame excitation cylinder 21 to the frame 9. The frame 9 can be constructed to be as light as possible. It is essentially formed (apart from the two cross pieces 27 and 28) by two side cheeks 29 which are arranged on both sides of the belt 3 and are connected by the two cross pieces 28 and 27 to carry the bearings for the two rollers 1 and 2.

Viewed parallel to the roller axes, the two side cheeks 29, in rough approximation, are designed in a trapezoidal shape or in an extended V-shape, which gives them a high load-bearing capacity with little use of material and in a light type of construction.

In order that the frame excitation cylinder 21 can also be used as a mechanical vertical guide for the frame 9 in a manner which simplifies the construction and reduces weight, the cylinder housing 23 of the frame excitation cylinder 21 is connected to the foundation 15 so as to be fixed in terms of tilting and rotation. The piston rod 22 of the frame excitation cylinder 21 is designed as a guide column and is connected to the frame 9, or the cross Piece 28, so as to be fixed in terms of tilting and rotation and, in addition, is guided in a stable manner in the cylinder housing 23. In order provide this stable guidance of the piston rod 22 in the cylinder housing 23, the piston rod 22 extends axially on both sides of the piston 24 of the frame excitation cylinder 21 so that the piston rod 22 can be guided over the entire longitudinal extent in the cylinder housing 23. Since work is carried out at relatively high working pressures during the excitation of oscillations, only a relatively small piston area is required for the piston which has pressure applied upon it on both sides. Since the piston rod 22 is designed as a guide column with a relatively large diameter, the piston can be designed as annular piston 24 in the form of a collar encircling the piston rod 22, which is particularly simple and beneficial in production. In addition, this reduces the moving masses. In this respect, to reduce weight, the piston rod 22 is designed as a hollow guide column. An upper working space 25 and lower working space 26 are allocated to the annular piston 24 on each side thereof so that the annular piston 24 can be acted upon hydraulically in both directions. High acceleration forces can thereby be exerted on the piston rod 22 and thus on the frame 9 during the excitation of oscillations.

The supporting-shoe excitation cylinder 12 is of relatively flat construction and is designed in a similar manner. Its cylinder housing 16 is rigidly connected to the cross piece 27. The piston rod 17 of is designed as a guide column and rigidly connected to the supporting shoe 11. The large-diameter piston rod 17 also carries an annular piston 18 designed as an encircling collar. The piston rod 17 can thereby extend axially on both sides of the piston 18 so that a relatively large guide length is available in the short cylinder housing 16. Here too, working spaces 19 and 20 are provided on both sides of the annular piston 18 respectively and are acted upon hydraulically in a known manner to excite oscillations.

The vertical spring mounting for frame 9 (designed in the form of a hydropneumatic spring) is integrated with the frame excitation cylinder 21. For this purpose, the piston rod 22 is provided with a further piston 30. The bottom of the piston 30 is acted upon by pressure stored in a gas-pressure accumulator 33. The pressure remains largely constant irrespective of the stroke. Since relatively high pressures can be stored in gas-pressure accumulators 33 of this type, the effective area of the piston 30 of the hydropneumatic spring can also be relatively small. The piston can thus be designed as an annular encircling collar which is simple and of a light type of construction. The bottom working space 31 can be compensated from a connectable pressure source (not shown) for any leakages therein. In addition, the vertical position of the flat-track unit relative to the ground level 6 can also be adjusted with such a hydraulic-oil feed system. The working space 32 located above the annular piston 30 is discharged into the oil sump and has no further function.

Owing to the splitting up of the excitation of oscillations into short-stroke and high-frequency oscillation portions for the supporting shoe excitation and long-stroke and low-frequency oscillation portions for the frame excitations, large relative movements of the test side 4 relative to the rollers 1, 2 in the vertical direction are avoided. Nonetheless, long-stroke vertical oscillations can be reproduced at the contact area 10 in a manner close to reality. Owing to its light type of construction, the flat-track unit is highly dynamic and the expenditure of the energy for its vertical excitation is relatively slight.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A flat-track unit for motor vehicle test beds comprising:
    a roadway-simulating endless belt loop means guided over two rollers for accommodating a vehicle wheel on its upper test side and orientated roughly horizontally at a ground level;
    wherein the two rollers are mounted in a frame, supported in a vertically floating manner by a spring mounting, and mechanically guided in the vertical direction,
    a rectilinear shoe means provided between the rollers for supporting the test side of the belt in a guiding or rolling manner at a contact region where a vehicle wheel is to be located;
    wherein said rectilinear supporting shoe means is vertically movable relative to the frame by a vertically orientated hydraulic shoe excitation cylinder;
    wherein said vertically orientated hydraulic excitation shoe cylinder acts centrally on the frame and is excited to develop vertical oscillations for simulating roadway vibrations;
    wherein one of the two rollers is Connected via a universal-joint shaft to a drive and braking unit for simulating traction and braking forces;
    wherein the drive and braking unit is spaced from and in a vertically immovable position next to the frame and has the same axis as the one roller;
    wherein the floating spring mounting of the frame is provided by hydropneumatic spring means supported and rigidly connected to a foundation;
    a shoe excitation cylinder located completely inside an area of the belt loop and rigidly supported at its bottom by the frame;
    wherein the shoe excitation cylinder is vertically excited by only short-stroke and high-frequency oscillations simulating roadway vibrations;
    wherein the frame is excited to develop vertical oscillations by a hydraulic frame excitation cylinder rigidly connected between a control bottom portion on the frame and the foundation; and wherein
    said hydraulic cylinder is excited by only the long-stroke, low-frequency oscillations simulating roadway vibrations.

2. Flat-track unit according to claim 1, wherein the frame has a cross piece means, which passes through the belt loop for supporting the supporting-shoe excitation cylinder; and
    wherein there is cross piece means arranged outside and below the belt loop for connecting the frame with the frame excitation cylinder.

3. A flat-track unit according to claim 2, wherein the frame is formed by two side cheeks which are arranged on both sides of the endless belt loop means and wherein the two side cheeks carry bearings for the two rollers and are connected by the two cross piece means.

4. A flat-track unit according to claim 3, wherein the two side cheeks are designed in a trapezoidal extended V-shape, as viewed parallel to the roller axes.

5. Flat-track unit according to claims 1, wherein a cylinder housing of the frame excitation cylinder is fixed, in terms of tilting and rotation, to the foundation; and
    wherein a piston rod of the frame excitation cylinder is designed as a guide column, fixedly connected to the frame and guided in a stable manner in the cylinder housing such that the frame excitation cylinder also serves as a mechanical vertical guide for the frame.

6. A flat-track unit according to of claim 5, wherein the floating spring mounting of the frame is obtained by a hydropneumatic spring with an actuating member acted upon hydraulically by a pressure that remains largely constant irrespective of movement of the actuating member.

7. A flat-track unit according to claim 6, wherein the actuating member is hollow.

8. A flat-track unit according to claim 6, wherein the hydraulic actuating member is integrated with the frame excitation cylinder as a piston operating on the actuating member and to which a hydraulically separate working space is allocated at the bottom of the piston.

9. A flat-track unit according to claim 6, wherein the further piston is designed as a collar encircling the piston rod.

10. A flat-track unit according to claim 5, wherein the piston rod is hollow.

11. A flat-track unit according to claim 5, wherein the piston rod of the frame excitation cylinder extends axially on both sides of a piston surface and is guided over its entire longitudinal extent in the cylinder housing.

12. A flat-track unit according to claim 1, wherein the piston surface is designed as an annular collar encircling the piston rod.

13. A flat-track unit according to claim 12, wherein a piston working space is provided on each side of the collar.

14. A flat-track unit according to of claim 1, wherein the floating spring mounting of the frame is obtained by a hydropneumatic spring with an actuating member acted upon hydraulically by a pressure that remains largely constant irrespective of movement of the actuating member.

15. A flat-track unit according to claim 14, wherein the hydraulic actuating member is integrated with the frame excitation cylinder as a piston operating on the actuating member and to which a hydraulically separate working space is allocated at the bottom of the piston.

16. A flat-track unit according to claim 15 wherein the further piston is designed as a collar encircling the piston rod.

17. A flat-track unit according to claim 15, wherein the actuating member is hollow.

18. A flat-track unit according to claim 14, wherein the actuating member is hollow.

* * * * *